United States Patent
Mackiewicz

(10) Patent No.: US 6,845,615 B1
(45) Date of Patent: Jan. 25, 2005

(54) MASTER CYLINDER

(75) Inventor: John Edmund Mackiewicz, Niles, MI (US)

(73) Assignee: Robert Bosch Corporation, Broadview, IL (US)

( * ) Notice: Subject to any disclaimer, the term of this patent is extended or adjusted under 35 U.S.C. 154(b) by 13 days.

(21) Appl. No.: 10/635,110

(22) Filed: Aug. 5, 2003

(51) Int. Cl.[7] .................................................. F15B 7/04
(52) U.S. Cl. ........................... 60/578; 60/585; 60/592
(58) Field of Search .................... 60/565, 574, 575, 60/578, 585, 592

(56) References Cited

U.S. PATENT DOCUMENTS

| | | | |
|---|---|---|---|
| 3,937,021 A | 2/1976 | Sisco | 60/575 |
| 4,133,178 A * | 1/1979 | Brooks, Sr. | 60/578 |
| 4,208,881 A | 6/1980 | Brademeyer | 60/578 |
| 4,445,334 A | 5/1984 | Derrick | 60/585 |
| 4,702,530 A | 10/1987 | Belart | 303/10 |

* cited by examiner

Primary Examiner—Thomas E. Lazo
(74) Attorney, Agent, or Firm—Leo H. McCormick, Jr.; Warren Comstock

(57) ABSTRACT

A master cylinder having a housing with first and second bores that are connected to a same circuit in a braking system. A first piston is sealingly retained in the first bore to define a first chamber and a second piston is sealingly retained in the second bore to define a second chamber. The first piston has of a first cylindrical member that is connected to a second cylindrical member by a shaft. The shaft includes an actuation and a retraction ramp that terminate at an apex. An input force applied to the second cylindrical member is directly applied through the shaft to the first cylindrical member and through the actuation and retraction ramps to the second piston to respectively communicate fluid simultaneously to the same circuit.

14 Claims, 1 Drawing Sheet

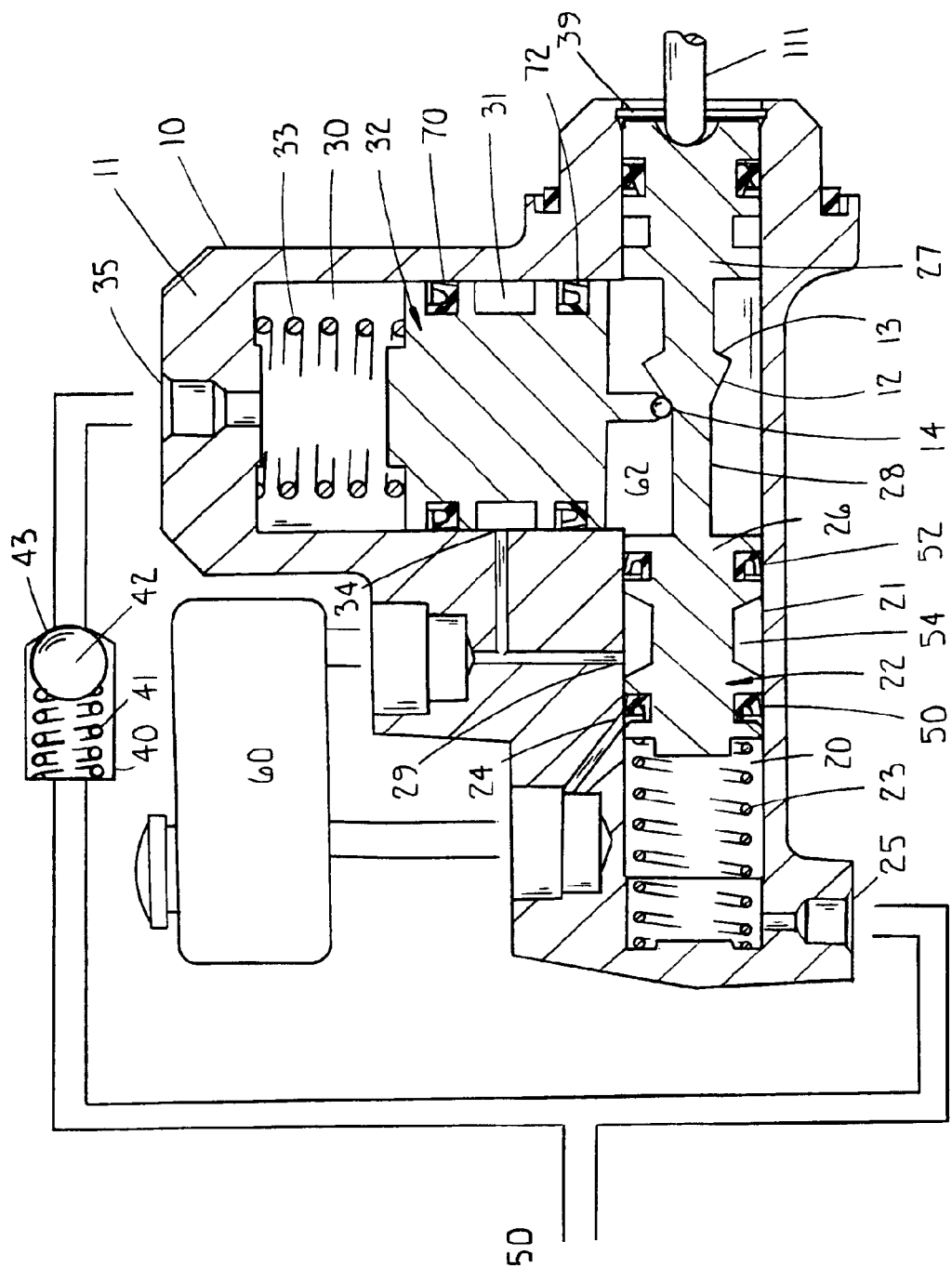

MASTER CYLINDER

This invention relates to a master cylinder having first and second chambers that communicate fluid to a same circuit in a braking system until a pre-determined volume of fluid has been communicated from the second chamber and thereafter communication exclusively continues from the first chamber during a brake application.

BACKGROUND OF THE INVENTION

It is known to provide a vehicle braking system with a master cylinder having a quick fill chamber such as disclosed in U.S. Pat. Nos. 3,937,021; 4,133,178; 4,208,881; 4,445,334; 4,702,530 to initially communicate fluid to the wheel brakes during a brake application. In such master cylinders a first chamber is defined by communicating a low pressure and high volume of fluid to provide a quick take-up of the components in a brake system and a second chamber is defined by communicating a high pressure and low volume of fluid to a brake system during a brake application. The chambers are established by a stepped bore in the housing that retain a corresponding stepped piston that is moved by an input force applied to input member. At the beginning of a brake application, fluid from the first chamber is communicated into the second chamber until a predetermined pressure level is reached. Once the pressure level is reached, a normally closed check valve opens and communication to from the first chamber is thereafter communicated to a reservoir to prevent further pressure build up in the first chamber. Unfortunately, this pressure level is retained in the take-up chamber during the duration of a brake application.

SUMMARY OF THE INVENTION

It is an object of this invention to provide a master cylinder having a quick take-up chamber with means whereby after a predetermined volume of fluid is supplied to a brake system, the fluid pressure in this take-up chamber is essentially eliminated and as a result does not effect the development of a brake application by an actuation force applied to a input member. In addition, the master cylinder has an improved brake pedal feel is provided during initial pedal travel of a brake application and a reduction in the time required to effect a brake application.

According to this invention, the master cylinder has a housing with first and second bores therein that are connected to a same circuit in a braking system. The first bore retains a first piston therein to define a first chamber while the second bore retains a second piston therein to define a second chamber. The first piston includes a first cylindrical member that is connected to a second cylindrical member by a shaft. The shaft is characterized by a peripheral member with an actuating ramp that radially extends from an axis of the shaft to an apex with a retracting ramp that radially extends from the shaft. The input member is directly connected to the second cylindrical member of the first piston while the second piston engages the connecting shaft by way of a roller. Upon receipt of an actuation force, the input member simultaneously moves the first piston in the first bore and the second piston in the second bore to simultaneously communicate fluid to the same braking system. Once a predetermined volume has been displaced from the second chamber as a function of movement of the second piston through the engagement of the roller on the actuation ramp to the apex, communication of fluid from the second chamber terminates as the roller now engages the retraction ramp and the second piston is returned to a position where the fluid pressure in the second chamber essentially eliminated. Elimination of the fluid pressure in the second chamber also essentially eliminates the development of any lateral force on the shaft through the roller engagement and as a result the actuation force is entirely applied to the first cylindrical member in the development of pressurized fluid exclusively in the first chamber during a brake application.

BRIEF DESCRIPTION OF THE DRAWINGS

The drawing is a schematic illustration of a cross section of a master cylinder according to the present invention.

DETAILED DESCRIPTION OF THE DRAWINGS

In the description that follows, components of the master cylinder that are identical may be identified by a same number plus 'unless necessary to better describe a functional relationship with another component.

The master cylinder 10 for use in a brake system according to this invention is shown in the drawing. The master cylinder 10 has a housing 11 that includes a first bore 21 and a second bore 31 that are connected to a same brake system 50. A first piston 22 is sealingly retained in the first bore 21 to define a first chamber 20. A first return spring 23 is located in the first chamber 20 urges the first piston 22 toward a stop 39 to define the limits of the first chamber 20 wherein the chamber 20 is connected through a first compensation port 24 and a second compensation port 29 to a reservoir 60 in the rest position.

The first piston 22 includes a first cylindrical member 26 that is connected to a second cylindrical member 27 by a shaft 28. The first cylindrical member 26 has a first seal 50 that is separated from a second seal 52 by a groove 54 that is connected to the reservoir through compensation port 29. The seals 50, 52 prevent communication from chamber 20 and reservoir 60 to a common chamber 62 in housing 11. The common chamber 62 is essentially at atmospheric pressure and connected to reservoir 60 by one way seal 52 on cylindrical body 26 and one way seal 72 on piston 32. The shaft 28 functions in the common chamber 62 and has a cylindrical body with a peripheral surface that includes an actuating or first ramp 12 that terminates at an apex with a retraction or second ramp 13. The first ramp 12 and second ramp 13 both radially extend from the axis of shaft 28 and have a relationship such that a slope of the first ramp 12 may be non-linear or linear with respect to the second ramp 13. The first ramp 12 is selected to match an actuation pattern for the brake system and it is anticipated that a slope of the first ramp 12 could vary from 30–60 degrees as long as a desired volume of fluid is quickly dispersed into the brake system through port 35 while the second ramp 13 would be selected to allow for the return spring 33 associated with the second piston 32 quickly return the second piston 32 to a position of rest.

The second piston 32 that is sealingly retained in the second bore 31 to define a second chamber 30. The size of the second chamber 30 with respect to the first chamber 20 is such that a large relative volume of fluid is retained therein and may reach a ratio of 2:1. A second return spring 33 that is located in the second chamber 30 urges the a roller 14 on the second piston 32 toward a stop defined by the peripheral surface of shaft 28 on the first piston 22 to set the limits of the second chamber 30. The second chamber 30 is connected to receive fluid from reservoir 60 by way of a third compensation port 34 in housing 11 and the flow of fluid past one way seal 70 carried by piston 32.

The first piston 22 and the second piston 32 receive an initial actuation force from an input member 111 that is directly applied to the second cylindrical member 27 of the first piston 22. Upon receipt of an actuation force, the first piston 22 directly moves within bore 21 to supply a volume of fluid to braking system 50 through the first outlet port 25 while the second piston 32 moves in bore 31 as a function of the engagement relationship of roller 14 and the actuation ramp 12 to communicate fluid through outlet port 35 to the braking system 50.

A large volume of fluid is communicated through outlet port 35 while a smaller volume of fluid is communicated through outlet port 25. The flow through outlet port 35 is under the control of a normally closed one way check valve 40 that is located between the second outlet port 35 and the braking system 50. The check valve 40 only allows fluid communication from the chamber 30 toward the brake system 50 and includes a ball 42 that is urged toward a seat 43 by a spring 41. During axial movement of shaft 28 in chamber 20, the roller 12 moves up the first ramp 12 to move piston 32 into chamber 30 to pressurize fluid therein. The pressure of the fluid in the second chamber 30 increases and after overcoming the force of the spring 41 in check valve 40 urges the ball 42 off seat 43 to open the check valve 40 to communicate fluid to the braking system 50. The communication of fluid from the second chamber 30 terminates once the roller 14 has reached the apex on shaft 28 and now roller 14 moves down the retraction or second ramp 13. As the roller moves down the retraction or second ramp 13 the fluid pressure in chamber 30 is reduced and is now lower than the fluid in the brake system 50 such that return spring 41 urges ball 42 into engagement with seat 43 to seal chamber 30 from the braking system. Thereafter, communication of pressurized fluid to the braking system 50 continues exclusively from the movement of the first cylindrical member 26 in the first chamber 20. When check valve 40 closes and the roller 14 moves down the retraction or second ramp 13, the second return spring 33 urges the second piston 32 toward a position of rest. As piston 32 moves toward a position of rest, chamber 30 expands such that the fluid pressure therein is essentially that of reservoir 60. When piston 32 moves toward a position of rest should any fluid needed to be added to the second chamber 30 fluid may flow from reservoir 60 past a seal 70 on the second piston 32. With the pressure in chamber 30 at reservoir pressure, no lateral forces are introduced to shaft 28 that would create side loading on the operation of piston 22.

I claim:

1. A master cylinder having a housing with a first and second bore therein, said first and second bores supplying a same braking system with pressurized fluid to effect a brake application, said first bore retaining a first piston to define a first chamber; said second bore retaining a second piston to define a second chamber; said first and second pistons being connected to an input member to receive an actuation force to effect the brake application, said first piston being characterized by a first cylindrical member that is connected to second cylindrical member by a shaft, said shaft having a peripheral surface with an actuation ramp that terminates at an apex with a retraction ramp, said second piston engaging said connecting shaft, said second cylindrical member upon receipt of an actuation force moving said first cylindrical member in said first chamber through said shaft and moving said second piston through the engagement of said second piston with said actuation ramp to respectively and simultaneously communicate first and second volumes of fluid to said braking system until said engagement of said second piston reaches said apex and as a result a pre-determined volume of fluid has been displaced from said second chamber such that thereafter exclusive communication of fluid to the brake system occurs from said first chamber to said braking system to effect a brake application; said second piston's movement being controlled by the sequential engagement of said actuation ramp, apex, and retraction second ramp such that communication of fluid from said second chamber only occurs while said second piston engages said actuation ramp and termination of communication of fluid from said second chamber occurs once said second piston reaches the apex and the pressure in said second chamber is eliminated with the engagement of the second piston with the retraction ramp.

2. The master cylinder as recited in claim 1 wherein said first and second bores are characterized by being in a perpendicular alignment with respect to one another.

3. The master cylinder as recited in claim 1 wherein said actuation and retraction ramps extend radially from the connecting shaft.

4. The master cylinder as recited in claim 1 wherein said second chamber contains a volume greater then said first chamber by a ratio of 2:1.

5. The master cylinder as recited in claim 1 wherein said actuation ramp has a slope of approximately 30 degrees.

6. The master cylinder as recited in claim 1 wherein said retraction ramp has a slope of approximately −60 degrees to rapidly terminate fluid pressure in said second chamber and prevent side loading of said shaft.

7. The master cylinder as recited in claim 1 wherein said retraction ramp has a length that is shorter than the actuation ramp.

8. The master cylinder as recited in claim 1 further including a check valve located between said second chamber and said braking system to prevent communication of volume of fluid from said first chamber to said second chamber when the engagement of said second piston reaches the apex on said shaft.

9. The master cylinder as recited in claim 1 further including a roller that is attached to said second piston and engages said actuation and retraction ramps.

10. The master cylinder as recited in claim 9 wherein the pressure in said second chamber approaches that of the reservoir when said roller engages said retraction ramp.

11. The master cylinder as recited in claim 1 wherein said any side loading of said shaft is essentially eliminated with the occurrence of the engagement of said second piston with the retraction ramp.

12. The master cylinder as recited in claim 1 wherein said actuation ramp has a non-linear surface such that the movement of said second piston in communicating the second volume to the brake system may vary according to the position of the shaft with respect to the first chamber.

13. The master cylinder as recited in claim 1 wherein said engagement of said second piston with said retraction ramp result in a diversion of the actuation force from the second piston back to the first piston during a brake application.

14. The master cylinder as recited in claim 1 wherein the engagement of said shaft and second piston occurs in a said housing in a chamber that is essentially at reservoir pressure.

* * * * *